United States Patent
Takada et al.

(10) Patent No.: US 8,305,481 B2
(45) Date of Patent: Nov. 6, 2012

(54) IMAGE PICKUP APPARATUS AND METHOD FOR CONTROLLING THE SAME

(75) Inventors: Yohei Takada, Osaka (JP); Hisamo Sogawa, Hyogo (JP); Hirokazu Naruto, Osaka (JP)

(73) Assignee: Sony Corporation (JP)

( * ) Notice: Subject to any disclaimer, the term of this patent is extended or adjusted under 35 U.S.C. 154(b) by 422 days.

(21) Appl. No.: 12/587,504

(22) Filed: Oct. 8, 2009

(65) Prior Publication Data

US 2010/0097513 A1    Apr. 22, 2010

(30) Foreign Application Priority Data

Oct. 21, 2008   (JP) ................. P2008-270898

(51) Int. Cl.
  *H04N 5/232* (2006.01)
  *H04N 5/222* (2006.01)
  *G03B 3/10* (2006.01)

(52) U.S. Cl. .......... 348/345; 348/349; 348/333.02; 396/123

(58) Field of Classification Search ........... 348/345, 348/350, 333.02, 333.03, 333.04, 353–356; 396/123
See application file for complete search history.

(56) References Cited

U.S. PATENT DOCUMENTS

| | | | |
|---|---|---|---|
| 7,298,412 B2 * | 11/2007 | Sannoh et al. | 348/350 |
| 2006/0182433 A1 * | 8/2006 | Kawahara et al. | 396/123 |
| 2007/0263909 A1 | 11/2007 | Ojima et al. | |
| 2007/0263933 A1 | 11/2007 | Ojima et al. | |
| 2007/0263934 A1 | 11/2007 | Ojima et al. | |
| 2007/0263935 A1 | 11/2007 | Sanno et al. | |
| 2007/0268370 A1 | 11/2007 | Sanno et al. | |
| 2008/0080739 A1 * | 4/2008 | Muramatsu | 382/103 |

FOREIGN PATENT DOCUMENTS

JP    2003-107335 A    4/2003

* cited by examiner

*Primary Examiner* — Nhan T Tran
(74) *Attorney, Agent, or Firm* — Lerner, David, Littenberg, Krumholz & Mentlik, LLP (57) ABSTRACT

An image pickup apparatus includes an image pickup device which captures an image regarding an object image, an object detector detecting a specific object from the captured image, a focus control unit configured to execute a focusing operation on the basis of a phase-difference detection signal obtained from a distance measurement area set at a predetermined position in an image capturing area, a display control unit configured to cause a display unit to display a display element indicating a position of the specific object, and a first determining unit configured to determine whether or not the focusing operation has been executed on the basis of the phase-difference detection signal regarding the specific object. The display control unit changes a display mode of the display element indicating the position of the specific object in accordance with the result of the determination performed by the first determining unit.

8 Claims, 8 Drawing Sheets

|  | DISPLAY OF AF AREA | DISPLAY OF FACE FRAME | |
|---|---|---|---|
| BEFORE AF OPERATION | CONSTANTLY DISPLAYED | AF AVAILABLE: ORANGE | AF UNAVAILABLE: WHITE |
| AFTER AF OPERATION | NOT DISPLAYED | AF PERFORMED: GREEN | AF NOT PERFORMED: WHITE |

| | DISPLAY OF FACE FRAME | | |
|---|---|---|---|
| | POSSIBILITY OF AF: HIGH | POSSIBILITY OF AF: LOW | AF UNAVAILABLE |
| BEFORE AF OPERATION | RED | ORANGE | WHITE |

FIG. 13

FIG. 14 ical finder. However, in an

IMAGE PICKUP APPARATUS AND METHOD FOR CONTROLLING THE SAME

CROSS-REFERENCE TO RELATED APPLICATION

The present application claims priority from Japanese Patent Application No. JP 2008-270898 filed in the Japanese Patent Office on Oct. 21, 2008, the entire content of which is incorporated herein by reference.

BACKGROUND OF THE INVENTION

1. Field of the Invention

The present invention relates to a display technique for use in an image pickup apparatus.

2. Description of the Related Art

In a single-lens reflex image pickup apparatus (hereinafter referred to also as "single-lens reflex camera"), an object is generally observed through an optical finder. However, in an image pickup apparatus which has a preview display function for displaying an object on a monitor as a moving image, the object can be observed on the monitor.

Some image pickup apparatuses having the preview display function are capable of detecting specific objects in the preview display and displaying the positions of the specific objects on the monitor (see, for example, Japanese Unexamined Patent Application Publication No. 2003-107335).

In general, a single-lens reflex camera includes an AF module which receives object light in AF areas set in an image capturing area in advance and detects focus information of the object. The single-lens reflex camera including the AF module performs an automatic focusing (AF) operation by a phase-difference detection method.

The image pickup apparatus having the above-described functions displays the positions of the detected specific objects and the positions of the AF areas in which the focus information can be obtained on the monitor. Accordingly, an image-capturing operation can be performed after selecting one of the specific objects as a subject of distance measurement.

SUMMARY OF THE INVENTION

However, when the positions of the specific objects and the positions of the AF areas are simply displayed on the monitor, it is difficult to determine whether or not the specific objects are actually in focus.

Accordingly, it is desirable to provide a technique for allowing a user to easily determine whether or not the specific objects are in focus.

An image pickup apparatus according to an embodiment of the present invention includes an image pickup device which captures an image regarding an object image; object detecting means for detecting a specific object from the captured image; focus control means for executing a focusing operation on the basis of a phase-difference detection signal obtained from a distance measurement area set at a predetermined position in an image capturing area; display control means for causing a display unit to display a display element indicating a position of the specific object; and first determining means for determining whether or not the focusing operation has been executed on the basis of the phase-difference detection signal regarding the specific object. The display control means changes a display mode of the display element indicating the position of the specific object in accordance with the result of the determination performed by the first determining means.

According to the embodiment of the present invention, whether or not the specific objects are in focus can be easily determined.

DESCRIPTION OF THE PREFERRED EMBODIMENTS

Embodiments of the present invention will be described below with reference to the accompanying drawings.

1. First Embodiment 1-1. Structure

Figure 1:
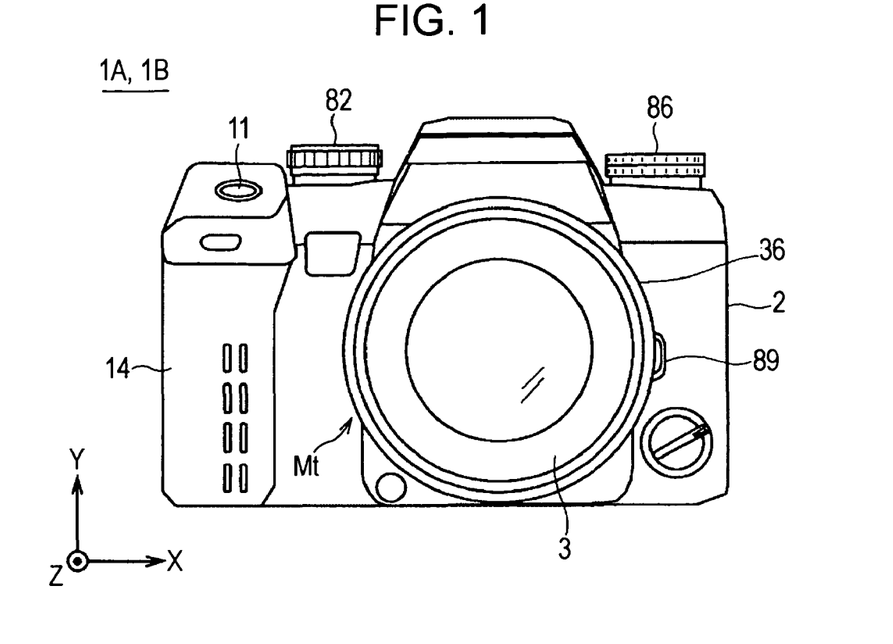
FIG. 1 is a diagram illustrating the external structure of an image pickup apparatus according to a first embodiment of the present invention.
Figure 2:
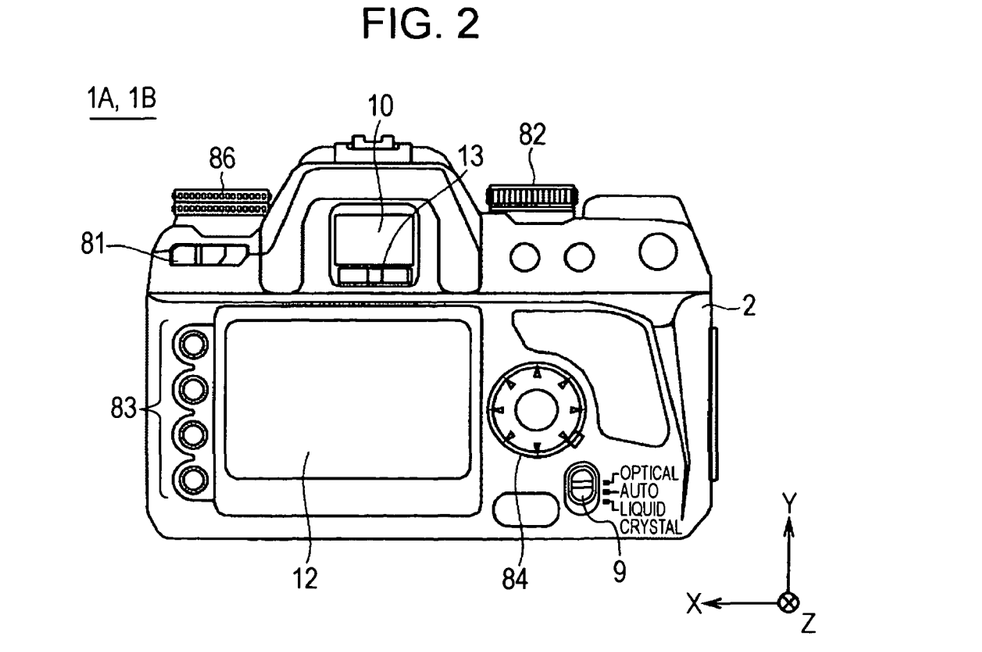
FIG. 2 is another diagram illustrating the external structure of the image pickup apparatus according to the first embodiment of the present invention.

FIGS. 1 and 2 are diagrams illustrating the external view of an image pickup apparatus 1A according to a first embodiment of the present invention. FIG. 1 is an external front view of the image pickup apparatus 1A. FIG. 2 is an external rear view of the image pickup apparatus 1A. The image pickup apparatus 1A is a single-lens reflex digital camera having a replaceable lens.

As shown in FIG. 1, the image pickup apparatus 1A includes a camera main body (camera body) 2. A replaceable image taking lens unit (replaceable lens) 3 is detachably attached to the camera main body 2.

The image taking lens unit 3 basically includes a barrel 36, a lens group 37 (see FIG. 3) disposed in the barrel 36, and an aperture stop (not shown). The lens group 37 includes a focusing lens which moves along an optical axis to change a focus position.

The camera main body 2 has an annular mount portion Mt to which the image taking lens unit 3 is attached at a central position on the front. A release button 89 for detaching the image taking lens unit 3 is provided near the annular mount portion Mt.

The camera main body 2 has a mode-setting dial 82 at an upper left position on the front and a control-value-setting dial 86 at an upper right position on the front. The mode-setting dial 82 is operated to set (switch between) various modes (image-capturing modes including a portrait mode and a landscape mode, a playback mode for playing back the captured images, a communication mode for communicating data with external apparatuses, etc.). The control-value-setting dial 86 is operated to set control values used in the respective image-capturing modes.

The camera main body 2 includes a grip portion 14 that can be gripped by a user at the left end on the front. A release button 11 for issuing a command to start exposure is provided on a top surface of the grip portion 14. A battery-accommodating chamber and a card-accommodating chamber are provided in the grip portion 14. The battery-accommodating chamber accommodates, for example, four AA batteries as a power source for the camera. The card-accommodating chamber is capable of accommodating a memory card 90 (see FIG. 5) in a detachable manner. The memory card 90 stores data of captured images.

The release button 11 is capable of detecting two states thereof: a half-pressed state (S1) and a fully pressed state (S2). When the release button 11 is pressed halfway and the state S1 is detected, preparation operations for capturing a still image of the object to be stored are performed. For example, an AF control operation and an AE control operation are performed as preparation operations. When the release button 11 is further pressed and the state S2 is detected, an image-capturing operation for capturing the image to be stored is performed. In the image-capturing operation, an exposure operation for the object image is performed using an image pickup device (also referred to as a "main image pickup device") 5 (described below) and an image signal obtained by the exposure operation is subjected to image processing.

Referring to FIG. 2, a monitor 12 is provided at a central position on the back of the camera main body 2. The monitor 12 includes, for example, a color liquid crystal display (LCD). The monitor 12 displays a menu screen used for setting image-capturing conditions and the like. In addition, in the playback mode, the monitor 12 shows a playback display of captured images stored in the memory card 90.

A finder window 10 is provided at an upper central position on the back of the camera main body 2. The object image obtained from the image taking lens unit 3 is guided to the finder window 10. The user can visually check an image that is equivalent to the object image captured by the main image pickup device 5 by looking through the finder window 10. More specifically, the object image incident on an image-capturing optical system is reflected upward by a mirror mechanism 6 (see FIG. 3) and is viewed by the user through an eyepiece 67. Thus, the user can determine the composition by looking through the finder window 10. When the state S2 of the release button 11 is detected and the image-capturing operation for capturing the image to be stored is started, the mirror mechanism 6 is removed from an optical path of the light which forms the object image. Accordingly, the light (light which forms the object image) from the image taking lens unit 3 reaches the main image pickup device 5, and an image (image data) of the object is captured by the main image pickup device 5.

A proximity sensor 13 is provided below the finder window 10. The proximity sensor 13 detects the presence of a nearby object, and is used to determine whether or not the finder is being used by the user.

A main switch 81 is provided at an upper left position of the monitor 12. The main switch 81 is a two-position slide switch. The power of the image pickup apparatus 1A is turned off when the main switch 81 is moved left to an OFF position, and is turned on when the main switch 81 is moved right to an ON position.

A direction selection key 84 and a display switch 9 are provided on the right of the monitor 12. The direction selection key 84 includes an annular operation button and is capable of individually detecting pressing operations of the operation button at four positions including top, bottom, left and right positions, and another four positions including upper left, upper right, lower left, and lower right positions. In addition to the above-described pressing operations at the eight positions in total, the direction selection key 84 can also detect a pressing operation of a push button provided at the center.

The display switch 9 is a three-position slide switch. When the display switch 9 is at a position indicated as "OPTICAL" at the top, an optical view finder (OVF) mode is selected and the object image is displayed in the field of view of the optical finder. Accordingly, the user can visually check the display in the field of view of the optical finder through the finder window 10, and can perform a composition determination operation (also referred to as a "framing" operation) using the display in the field of view of the optical finder.

When the display switch 9 is at a position indicated as "LIQUID CRYSTAL" at the bottom, an electronic view finder (EVF) mode, which will be described below, is selected and a live view image of the object image is displayed on the monitor 12 as a moving image (live view display or preview display). Accordingly, the user can perform the flaming operation while visually checking the live view display displayed on the monitor 12.

In addition, when the display switch 9 is at a position indicated as "AUTO" in the middle, switching between the display in the field of view of the optical finder and the live view display is automatically performed depending on whether or not the user is looking through the finder window 10. Accordingly, the user can perform the flaming operation while visually checking the display in the field of view of the optical finder or the display of the live view.

A setting button group 83 including a plurality of buttons for setting the menu screen, deleting images, etc., is provided on the left of the monitor 12.

Figure 3:
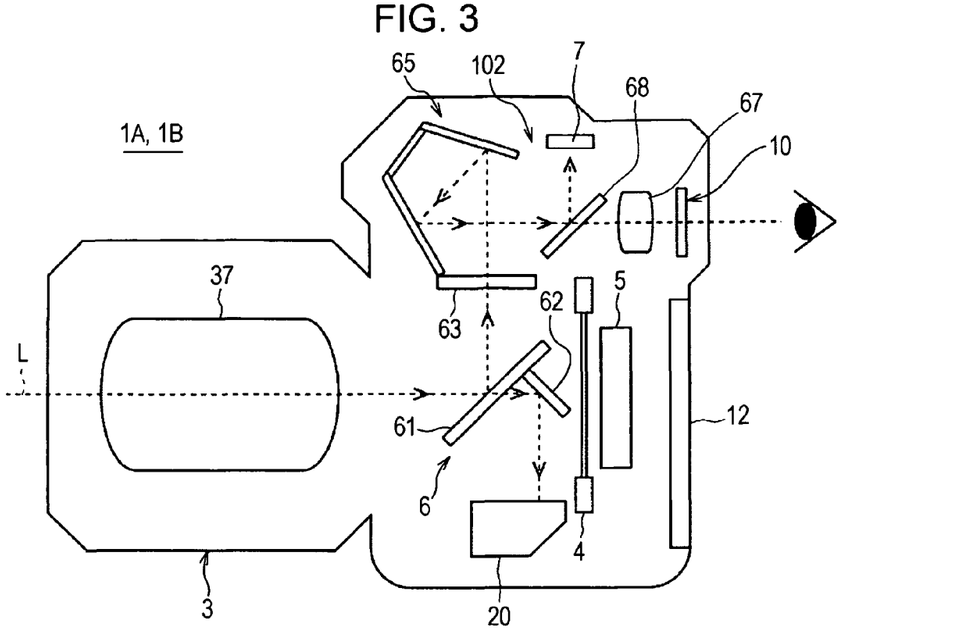
FIG. 3 is a vertical sectional view of the image pickup apparatus according to the first embodiment.
Figure 4:
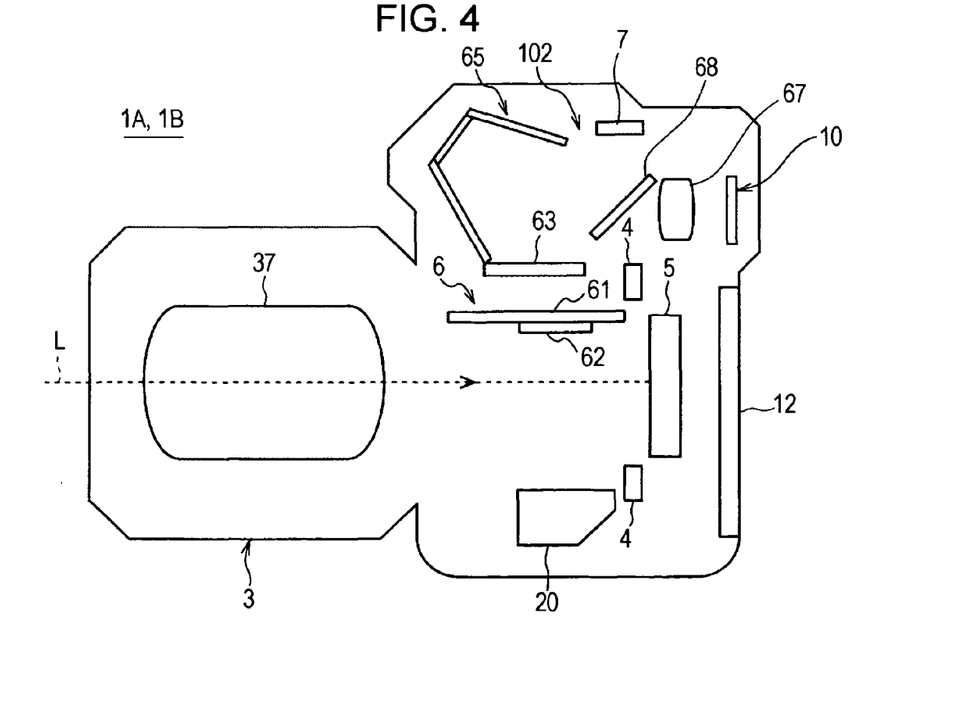
FIG. 4 is another vertical sectional view of the image pickup apparatus according to the first embodiment.

Next, the inner structure of the image pickup apparatus 1A will be described. FIGS. 3 and 4 are sectional views of the image pickup apparatus 1A according to the first embodiment.

As shown in FIG. 3, the image pickup apparatus 1A includes a finder unit (finder optical system) 102, the mirror mechanism 6, a phase-difference AF module (hereinafter also referred to simply as an AF module) 20, a shutter 4, the main image pickup device 5, and a sub image pickup device 7.

The main image pickup device (CCD sensor (also referred to simply as CCD) in this example) 5 is disposed on an optical axis L of a lens group 37 included in the image taking lens unit 3, and is arranged along a plane perpendicular to the optical axis L. The main image pickup device 5 receives an object image at an imaging surface thereof, and converts the received object image into an electric signal by photoelectric conversion. Thus, an image signal of the image to be stored is generated.

The shutter 4 is disposed immediately in front of the main image pickup device 5. The shutter 4 is a mechanical focal plane shutter which includes curtain members which move in the vertical direction, and performs an operation of opening and closing an optical path of the object light guided to the main image pickup device 5 along the optical axis L.

The mirror mechanism 6 (reflection plate) is disposed on the optical axis L at a position where the object light can be reflected toward the finder unit 102. The object light which passes through the image taking lens unit 3 is reflected upward by the mirror mechanism 6 (main mirror 61 described below), and is focused on a focusing glass (ground glass) 63.

The finder unit 102 includes a penta-mirror 65, a half mirror 68, the eyepiece 67, the sub image pickup device 7, and the finder window 10. The penta-mirror 65 has a function of reflecting the object image such that an erect image is obtained by vertically and horizontally reversing the object image. The half mirror 68 is disposed between the penta-mirror 65 and the eyepiece 67, and separates (branches) the object light. The object light is divided into an object light component guided to the eyepiece 67 and an object light component guided to the sub image pickup device 7. The eyepiece 67 guides the object light component guided thereto to the outside of the finder window 10. Thus, the user can visually check the object image by looking through the finder window 10. Thus, the finder unit 102 functions as an optical view finder (OVF) used to visually check the object in the standby state.

The sub image pickup device 7 receives the object light component guided thereto and successively captures images of the object. The thus-captured images are successively displayed on the monitor 12 as a moving image (live view display). Thus, the object images which can be viewed through the finder window 10 are captured by the sub image pickup device 7, and the user can view the live view image of the object on the monitor 12.

The mirror mechanism 6 includes the main mirror 61 and a sub-mirror 62. The sub-mirror 62 is provided on the back side of the main mirror 61 such that the sub-mirror 62 is rotatable toward the main mirror 61. The main mirror 61 is composed of, for example, a half mirror, and allows a part of the object light to pass therethrough. The part of the object light that passes through the main mirror 61 is reflected by the sub mirror 62, and is guided to the AF module 20.

The mirror mechanism 6 is formed as a so-called quick return mirror. When the state S2 of the release button 11 is detected and the exposure operation is performed, the mirror mechanism 6 is moved upward and is stopped at a position below the focusing glass 63 (see FIG. 4). Accordingly, the object light from the image taking lens unit 3 reaches the main image pickup device 5 without being blocked by the mirror mechanism 6, and the main image pickup device 5 is subjected to the exposure operation. After the exposure, the mirror mechanism 6 returns to the original position (position shown in FIG. 3).

The AF module 20 is formed as a so-called AF sensor including line sensors or the like which detect the focus information of the object. More specifically, the AF module includes a pair of line sensors which receive the light from the object in each of distance measurement areas (also referred to as "AF areas") set in the image capturing area. The AF module 20 has a function of outputting a phase-difference detection signal based on the outputs from the pair of line sensors to an overall controller 101.

1-2. Functional Blocks

Figure 5:
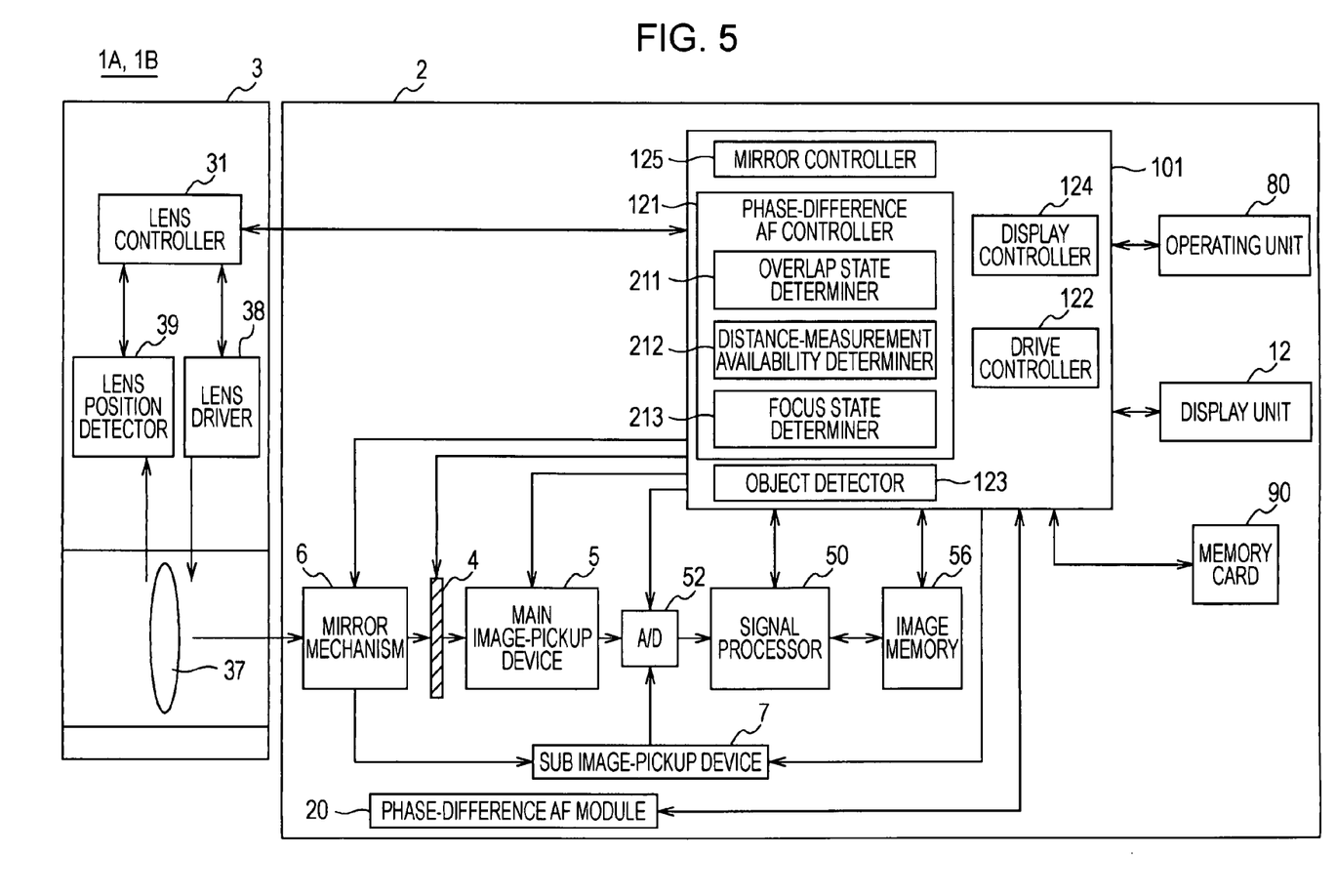
FIG. 5 is a block diagram illustrating the functional structure of the image pickup apparatus according to the first embodiment.
Figure 6:
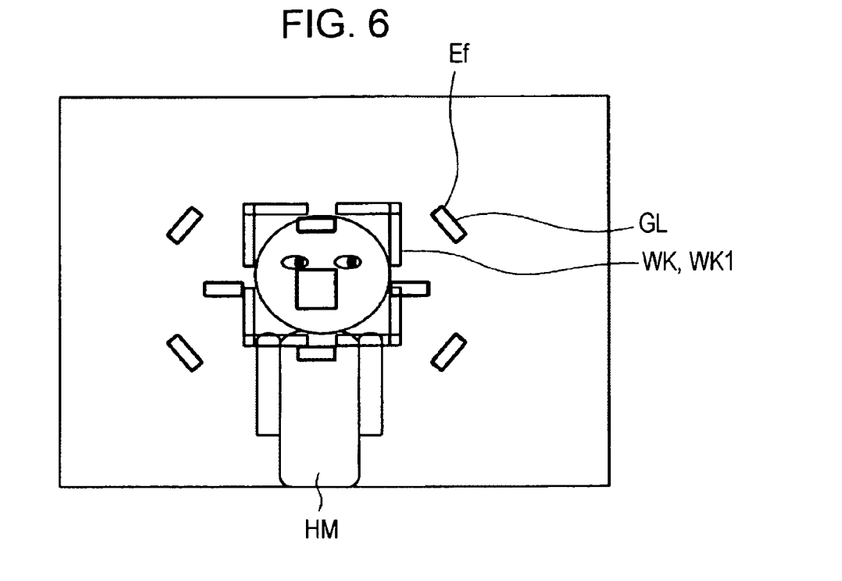
FIG. 6 is a diagram illustrating a display screen of a monitor in a composition determination operation.

Functions of the image pickup apparatus 1A will now be described. FIG. 5 is a block diagram illustrating the functional structure of the image pickup apparatus 1A according to the first embodiment. FIG. 6 is a diagram illustrating a display screen displayed on the monitor 12 in the composition determination operation.

As shown in FIG. 5, the image pickup apparatus 1A includes the phase-difference AF module 20, an operating unit 80, the overall controller 101, the mirror mechanism 6, the shutter 4, the image pickup device 5, an A/D converter circuit 52, a digital signal processor circuit 50, and an image memory 56.

The operating unit 80 includes various switches and buttons including the release button 11 (see FIG. 1). The overall controller 101 performs various operations in response to an input operation performed by the user using the operating unit 80.

The main image pickup device 5 receives drive control signals from a timing control circuit (not shown), and performs an exposure operation (charge accumulation performed by causing photoelectric conversion) for an object image formed on a light-receiving surface (imaging surface) in response to the received drive control signals. As a result, an image signal corresponding to the object image is obtained.

The sub image pickup device 7 basically has a function similar to that of the main image pickup device 5. The sub image pickup device 7 performs an exposure operation for an object image guided to the finder optical system, and obtains an image signal regarding an image to be displayed as a live view image.

The image signal (analog signal) obtained by the main image pickup device 5 is converted into a digital signal by the A/D converter circuit 52. The thus-obtained digital image signal is input to the digital signal processor circuit 50.

The digital signal processor circuit 50 subjects the image signal input from the A/D converter circuit 52 to digital signal processes. More specifically, a black-level correction process, a white balance (WB) process, a γ correction process, etc., are performed. After the signal processes, the image signal (image data) is stored in the image memory 56.

The image memory 56 is a high-speed-accessible memory for temporarily storing the generated image data and has a capacity large enough to store data of a plurality of frames of images.

In the image-capturing operation for capturing an image to be stored, the image data that is temporarily stored in the image memory 56 is subjected to image processing (for example, compressing process) by the overall controller 101 as necessary, and is then stored in the memory card 90.

The image data obtained by the sub image pickup device 7 is subjected to predetermined processes by the A/D converter circuit 52 and the digital signal processor circuit 50. Then, the thus-processed data is temporarily stored in the image memory 56 and is displayed on the monitor 12.

The overall controller 101 is formed of a microcomputer, and basically includes a CPU, a RAM, and a ROM. The overall controller 101 reads programs stored in the ROM and causes the CPU to execute the programs, thereby carrying out various functions.

The overall controller 101 executes the above-mentioned programs to carry out the functions of a phase-difference AF controller 121, a drive controller 122, an object detector 123, a display controller 124, and a mirror controller 125.

The phase-difference AF controller 121 performs an auto-focus (AF) operation (phase-difference AF operation) by the phase-difference AF method. More specifically, the phase-difference AF controller 121 performs a lens-focus-position determination operation for determining the position (lens focus position) of the image taking lens (to be more specific, the focusing lens) in a focused state on the basis of the phase-difference detection signal output from the AF module 20.

The phase-difference AF controller 121 also caries out the functions of an overlap state determiner 211, a distance-measurement availability determiner 212, and a focus state determiner 213.

The overlap state determiner 211 determines whether or not a specific object (face area in this example) detected from the captured image by the object detector 123, which will be described below, overlaps any one of the AF areas Ef, which will be described below.

If it is determined by the overlap state determiner 211 that the specific object overlaps any one of the AF areas, the distance-measurement availability determiner 212 determines whether or not the focusing operation can be performed on the basis of the phase-difference detection signal output from the AF area which overlaps the specific object.

After the execution of the focusing operation, the focus state determiner 213 determines whether or not the specific object has been subjected to the focusing operation on the basis of the phase-difference detection signal corresponding to the specific object.

In addition, the phase-difference AF controller 121 operates in association with the drive controller 122 to perform a lens-driving operation for moving the image taking lens (focusing lens) to the determined lens focus position.

The drive controller 122 has a function of controlling the operation of driving the image taking lens, and actually drives the image taking lens in association with the phase-difference AF controller 121.

More specifically, the phase-difference AF controller 121 transmits a control signal to a lens controller included in the image taking lens unit 3 via the drive controller 122. Accordingly, the lens driver 38 is driven so as to move the focusing lens included in the lens group 37 in the image taking lens unit 3 along an optical axis. The position of the focusing lens is detected by a lens position detector 39 included in the image taking lens unit 3, and data representing the position of the focusing lens is transmitted from the lens controller 31 to the overall controller 101 in the camera main body.

The object detector 123 specifies a specific object, which is set as a detection target, in an image (auxiliary image) captured by the sub image pickup device 7. In this example, a human face (also referred to as a "face area") is set as the detection target, and a face area is detected from the auxiliary image.

The face area may be detected by, for example, the following method. That is, first, a skin-colored area is extracted from the captured image on the basis of the pixel value of each pixel. Then, if the area of the extracted skin-colored area is equal to or larger than a predetermined threshold, it is determined that the skin-colored area is a human face. Alternatively, a human face may also be detected by extracting specific parts, such as eyes and a mouth, of a human face from the captured image by a common pattern recognition method.

The display controller 124 controls display contents shown on a display unit of the monitor 12. The display controller 124 causes the monitor 12 to display the live view image on the basis of a plurality of images that are successively captured by the sub image pickup device 7.

The display controller 124 also has a function of causing the monitor 12 to show display elements, each of which indicates the position of a specific object (human face in this example) specified by the object detector 123, on the live view image. The positions of the detected faces are shown by, for example, frames (hereinafter also referred to as "face frames" or "face display frames") WK which surround the corresponding face areas. In FIG. 6, a face frame WK1 which surrounds a human face HM is displayed.

In addition, the display controller 124 also has a function of causing the monitor 12 to show display elements corresponding to the AF areas set in the image capturing area on the auxiliary image displayed on the monitor 12. The display elements corresponding to the AF areas may be, for example, line images. In FIG. 6, nine line images GL are displayed.

The display elements corresponding to the AF areas indicate the positions of the AF areas in the case where the AF areas set in the image capturing area are shown on the auxiliary image (display screen of the monitor 12), and are referred to as the corresponding AF areas (or "equivalent AF areas").

The mirror controller 125 controls the operation of switching between the state in which the mirror mechanism 6 is removed from the optical path (mirror-up state) and the state in which the mirror mechanism 6 blocks the optical path (mirror-down state). The mirror controller 125 switches between the mirror-up state and the mirror-down state by driving a mirror switch motor (not shown).

Summary of Display Control

Figure 7:
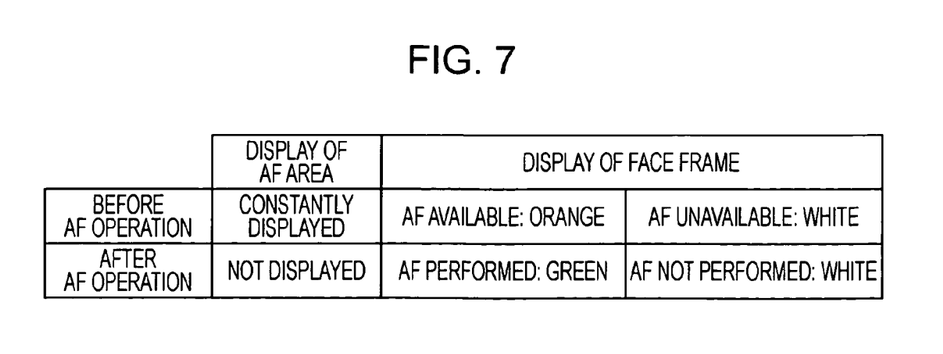
FIG. 7 is a transition diagram illustrating the display mode of corresponding AF areas and face frames.

In the flaming operation using the live view display, the corresponding AF areas Ef and the face frames WK are displayed on the monitor 12. The display mode of the corresponding AF areas Ef and the face frames WK after the execution of the automatic focusing operation is changed from that before the execution of the automatic focusing operation. FIG. 7 is a transition diagram of the display mode of the corresponding AF areas Ef and the face frames WK.

As shown in FIG. 7, before the execution of the AF operation, the corresponding AF areas Ef are constantly displayed. The display mode of each face frame WK differs depending on whether or not focusing (distance measurement) can be performed for the face area indicated by the face frame WK. In the present embodiment, an example will be described in which each face frame WK is displayed in orange if focusing for the specific object indicated by the face frame WK is possible, and is displayed in white if focusing for the specific object indicated by the face frame WK is not possible.

After the execution of the AF operation, the corresponding AF areas Ef are removed from the monitor 12. The display mode of each face frame WK differs depending on whether or not the face area indicated by the face frame WK has been set as the target of distance measurement and the AF operation for the corresponding specific object has been performed. In the present embodiment, each face frame WK is displayed in green if the AF operation for the corresponding specific object has been performed, and is displayed in white if the AF operation for the corresponding specific object has not been performed.

The display control operations performed before and after the AF operation will now be described.

Figure 8:
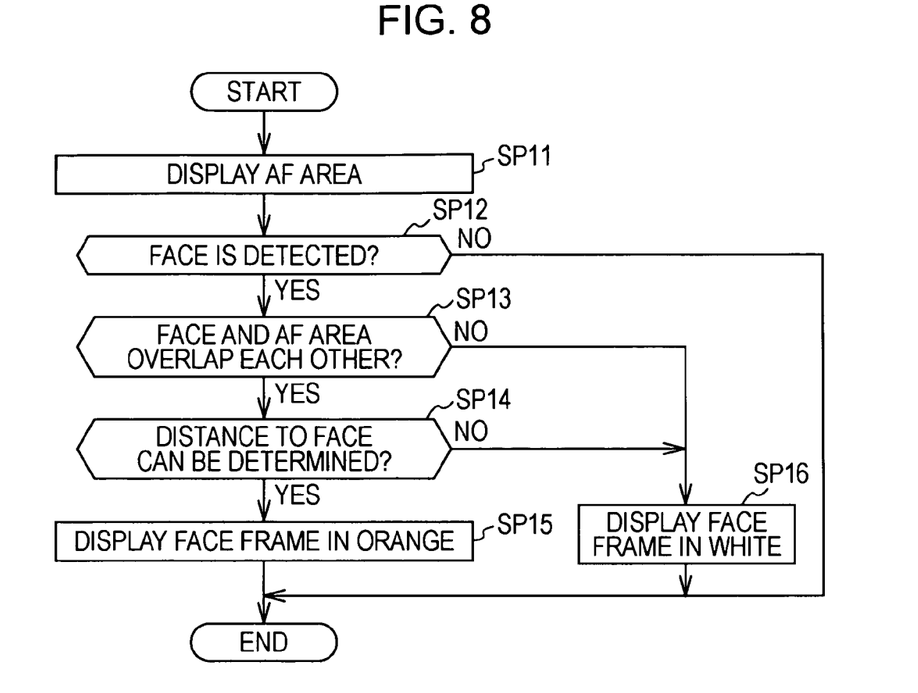
FIG. 8 is a flowchart of a display control operation performed before an AF operation.
Figure 9:
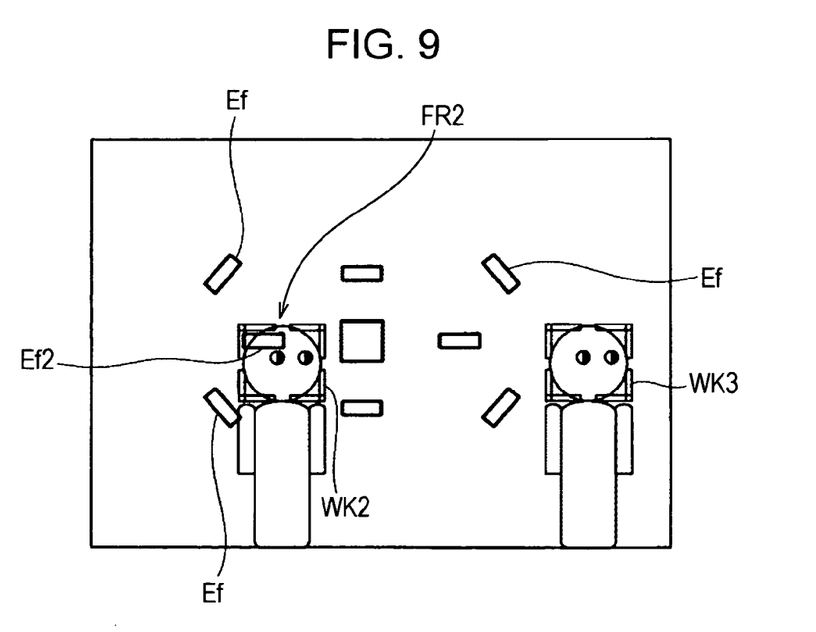
FIG. 9 is another diagram illustrating a display screen of a monitor in a composition determination operation.

First, the display control operation performed before the AF operation will be described. FIG. 8 is a flowchart of the display control operation performed before the AF operation. FIG. 9 is a diagram illustrating a display screen displayed on the monitor 12 in the composition determination operation.

Referring to FIG. 8, the process proceeds to step SP11 when the EVF mode is selected in response to, for example, the operation of the display switch 9.

In step SP11, the live view image is displayed on the monitor 12 by the display controller 124, and all of the corresponding AF areas Ef are superimposed on the monitor 12 (see FIG. 6).

In step SP12, the object detector 123 determines whether or not a specific object is detected. If a specific object is detected, the process proceeds to step SP13. If no specific object is detected, the display control operation before the AF operation is ended.

In step SP13, the overlap state determiner 211 in the phase-difference AF controller 121 determines whether or not the specific object overlaps one or more of the corresponding AF areas Ef.

Whether or not the specific object overlaps one or more of the corresponding AF areas Ef can be determined by, for example, the following method. That is, the coordinates of each pixel included in the corresponding AF areas Ef on the auxiliary image are compared with the coordinates of each pixel in the detected specific object. Thus, it is determined whether or not at least some of the pixels in the corresponding AF areas Ef are included in the detected specific object.

The coordinates of each pixel in the corresponding AF areas Ef on the auxiliary image are obtained at the time when the image pickup apparatus 1A is manufactured, and are stored in the ROM or the like of the image pickup apparatus 1A in advance.

Thus, in step SP13, it is determined that the specific object overlaps one or more of the corresponding AF areas Ef if it is determined that at least some of the pixels in the corresponding AF areas Ef on the auxiliary image are included in the specific object.

If it is determined in step SP13 that the specific object overlaps none of the corresponding AF areas Ef, the process proceeds to step SP16, and it is determined that automatic focusing for the specific object is not possible. Accordingly, the corresponding face frame WK is displayed in white.

If it is determined in step SP13 that the specific object overlaps one or more of the corresponding AF areas Ef, the process proceeds to step SP14.

In step SP14, the distance-measurement availability determiner 212 in the phase-difference AF controller 121 determines whether or not the focusing operation can be performed using phase-difference detection signals obtained from one or more AF areas (also referred to as "overlapping AF areas") which overlap the specific object.

As described above, whether or not the focusing operation can be performed is determined on the basis of the phase-difference detection signals obtained from the overlapping AF areas, that is, the outputs from the line sensors. More specifically, if there is no difference between the outputs from the pair of line sensors corresponding to a certain overlapping AF area and the contrast is low in the overlapping AF area, it is determined that the phase-difference detection signal obtained from that overlapping AF area is ineffective and that it is not possible to perform the focusing operation.

If it is determined in step SP14 that it is not possible to perform the focusing operation, the process proceeds to step SP16, and it is determined that automatic focusing for the specific object is not possible. Accordingly, the face frame WK indicating the specific object is displayed in white.

If it is determined in step SP14 that the focusing operation can be performed, the process proceeds to step SP15, and it is determined that automatic focusing for the specific object is possible. Accordingly, the face frame WK indicating the specific object is displayed in orange.

Thus, the phase-difference AF controller 121 determines whether or not the focusing operation can be performed for the specific object in steps SP13 and SP14, and the display mode of the face frame WK is changed in accordance with the result of the determination.

For example, it is assumed that two face areas FR2 and FR3 are detected as the specific objects, as shown in FIG. 9. The face area FR2 overlaps the corresponding AF area Ef2, and the face area FR3 does not overlap any of the corresponding AF areas Ef. In this case, since the face area FR2 overlaps one of the corresponding AF areas Ef, it is determined that automatic focusing for the face area FR2 is possible. Therefore, the corresponding face frame WK2 is displayed in orange. In addition, since the face area FR3 does not overlap any of the corresponding AF areas Ef, it is determined that automatic focusing for the face area FR3 is not possible. Therefore, the corresponding face frame WK3 is displayed in white.

The above-described display control operation before the AF operation is executed, for example, every predetermined time, and the display of the corresponding AF areas Ef and the face frames WK is changed in accordance with a change in the composition.

Figure 10:
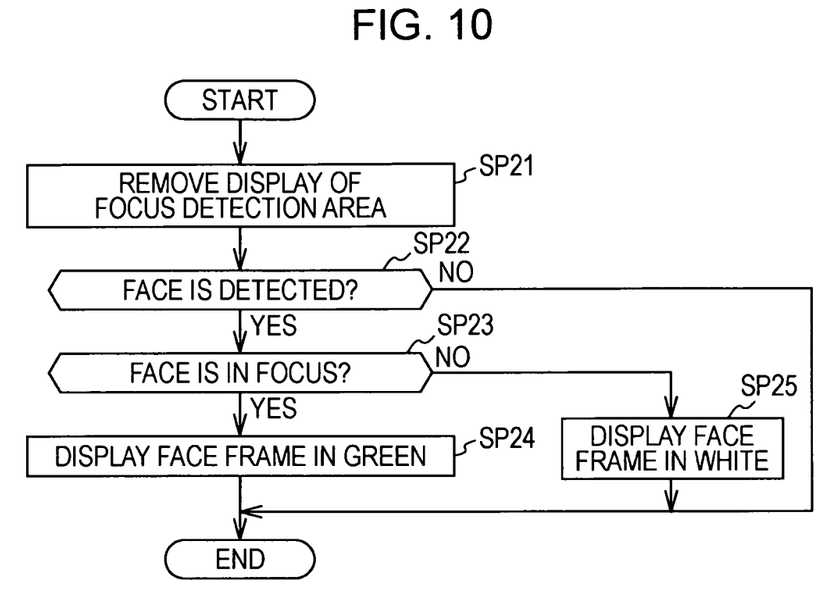
FIG. 10 is a flowchart of a display control operation performed after the AF operation.
Figure 11:
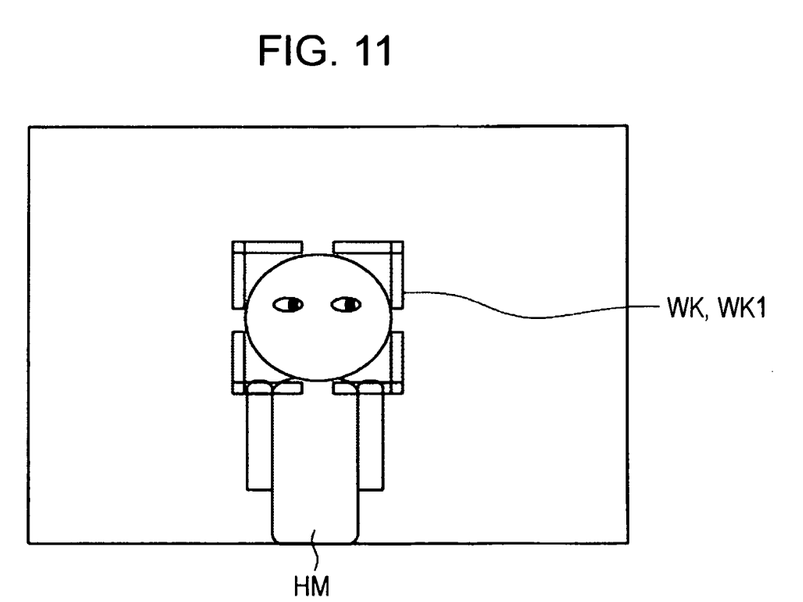
FIG. 11 is a diagram illustrating a display screen of the monitor after the AF operation.

Next, the display control operation after the AF operation will be described. FIG. 10 is a flowchart of the display control operation performed after the AF operation. FIG. 11 is a diagram illustrating a display screen displayed on the monitor 12 after the AF operation.

As shown in FIG. 10, the AF operation is executed when the half-pressed state of the release button 11 is detected.

After the of the AF operation, the corresponding AF areas Ef are removed from the monitor 12 in step SP21 (see FIG. 11).

In step SP22, it is determined whether or not a specific object is detected by the object detector 123. If a specific object is detected, the process proceeds to step SP23. If no specific object is detected, the display control operation after the AF operation is ended.

In step SP23, the focus state determiner 213 determines whether or not the specific object has been brought into focus.

Whether or not the specific object has been brought into focus is determined on the basis of whether or not the AF operation has been performed using the phase-difference detection signals obtained from the overlapping AF areas for which it has been determined by the distance-measurement availability determiner 212 that the focusing operation can be performed.

If it is determined in step SP23 that the specific object has been brought into focus, the process proceeds to step SP24 and the color of the face frame WK indicating the specific object is changed from white to green. If it is determined in step SP23 that the specific object has not been brought into focus, the process proceeds to step SP25, and the color of the face frame WK indicating the specific object is not changed and remains white.

In the display control operation after the AF operation, the corresponding AF areas Ef are removed from the monitor 12. Accordingly, in the case where the user performs an image-capturing operation using an AF lock method in which a lens focusing position is set by placing an AF area on a human face in advance and then the composition is determined, the image capturing operation can be prevented from being hindered by the display of the AF areas Ef on the monitor 12.

The display mode of each face frame WK is changed in accordance with the result of the determination performed by the focus state determiner 213. That is, the display mode of each face frame WK is changed if it is determined that the corresponding specific object has been brought into focus. Therefore, the user can easily recognize that the specific object has been brought into focus. In addition, since the display mode of the face frame WK is changed, the user can recognize the specific object which is in focus even when the display of all of the corresponding AF areas Ef is removed.

2. Second Embodiment

Figure 12:
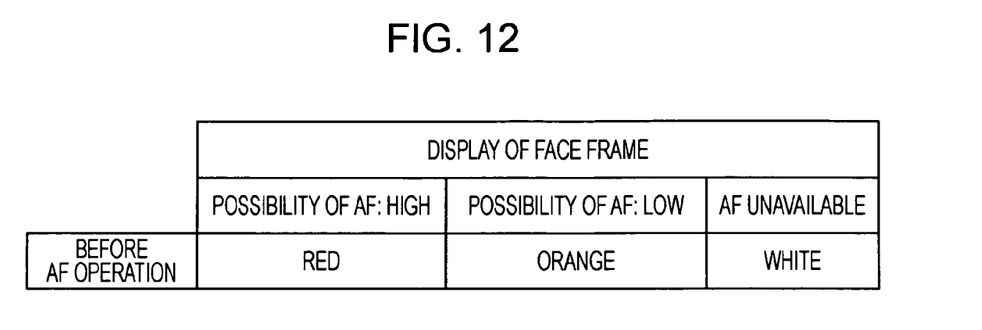
FIG. 12 is a transition diagram illustrating the display mode of the face frames before the AF operation according to a second embodiment.
Figure 13:
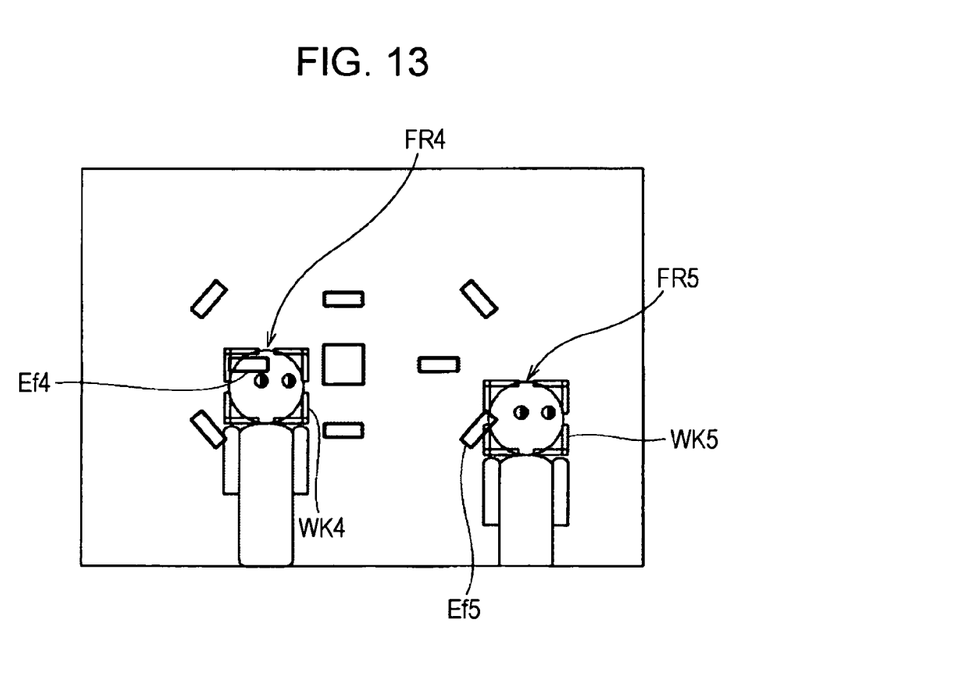
FIG. 13 is a diagram illustrating a display screen of a monitor in a composition determination operation.

Next, a second embodiment of the present invention will be described. In the image pickup apparatus 1A according to the first embodiment, the display mode of each face frame WK is changed in accordance with whether or not the focusing operation can be performed for the corresponding detected specific object. However, in an image pickup apparatus 1B according to the second embodiment, the display mode of each face frame WK is changed in accordance with the possibility that the corresponding specific object can be brought into focus. FIG. 12 is a transition diagram of the display mode of the face frames WK performed before the AF operation. FIG. 13 is a diagram illustrating a display screen displayed on the monitor 12 in the composition determination operation.

The structure and functions of the image pickup apparatus 1B according to the second embodiment are basically similar to those of the image pickup apparatus 1A (see FIGS. 1 to 5). However, the function of the overlap state determiner 211 of the image pickup apparatus 1B differs from that of the image pickup apparatus 1A. The difference from the first embodiment will now be described in detail.

As described above, in the image pickup apparatus 1B, the display mode of each face frame WK before the execution of the AF operation differs in accordance with the possibility (focus possibility) that the face area indicated by the face frame WK can be brought into focus (the distance measurement can be performed). More specifically, as show in FIG. 12, the face frame WK of each specific object is displayed in red if the focusing possibility for the specific object is high, and is displayed in orange if the focusing possibility for the specific object is low. In addition, if the focusing possibility is 0, the face frame WK is displayed in white.

The focusing possibility of each specific object is determined in accordance with the degree of overlap between the specific object and the corresponding AF areas Ef.

The overlap state determiner 211 included in the image pickup apparatus 1B determines the degree of overlap between each specific object detected from the captured image by the object detector 123 and the corresponding AF areas Ef.

The degree of overlap is determined on the basis of the number of pixels in the corresponding AF areas Ef (also referred to as "area pixels") which are included in the specific object.

More specifically, if the number of area pixels which are included in the specific object is equal to or more than a predetermined number, it is determined that the "degree of overlap between the specific object and the corresponding AF areas Ef is high". If the number of area pixels which are included in the specific object is less than the predetermined number but at least some of the area pixels are included in the specific object, it is determined that the "degree of overlap between the specific object and the corresponding AF areas Ef is low". If none of the area pixels is included in the specific object, it is determined that "the specific object does not overlap any of the corresponding AF areas Ef".

If it is determined that the degree of overlap between the specific object and the corresponding AF areas Ef is high, there is a high possibility that the phase-difference detection signal corresponding to the specific object can be obtained. Therefore, in this case, the phase-difference AF controller 121 determines that the possibility that the specific object can be brought into focus is high.

If it is determined that the degree of overlap between the specific object and the corresponding AF areas Ef is low, the possibility that the phase-difference detection signal corresponding to the specific object can be obtained is low. Therefore, in this case, the phase-difference AF controller 121 determines that the possibility that the specific object can be brought into focus is low.

If it is determined that the specific object does not overlay with any of the corresponding AF areas, it is not possible to obtain the phase-difference detection signal corresponding to the specific object. Therefore, in this case, the phase-difference AF controller 121 determines that the possibility that the specific object can be brought into focus is 0.

Thus, the phase-difference AF controller 121 functions as a focusing-possibility determiner which determines the possibility that the specific object can be brought into focus on the basis of the positional relationship between the specific object and the corresponding AF areas Ef.

The display controller 124 changes the display mode of the face frame WK of each specific object on the basis of the result of the determination of the focusing possibility performed by the phase-difference AF controller 121.

For example, in the case where it is determined that the degree of overlap is high when equal to or more than half of the area pixels are included in the specific object, the face frame WK4 shown in FIG. 13 is displayed in red because more than half of the pixels in the corresponding AF area Ef4 are included in the face area FR4. In addition, the face frame WK5 shown in FIG. 13 is displayed in orange because less than half of the pixels in the corresponding AF area Ef5 are included in the face area FR5.

Figure 14:
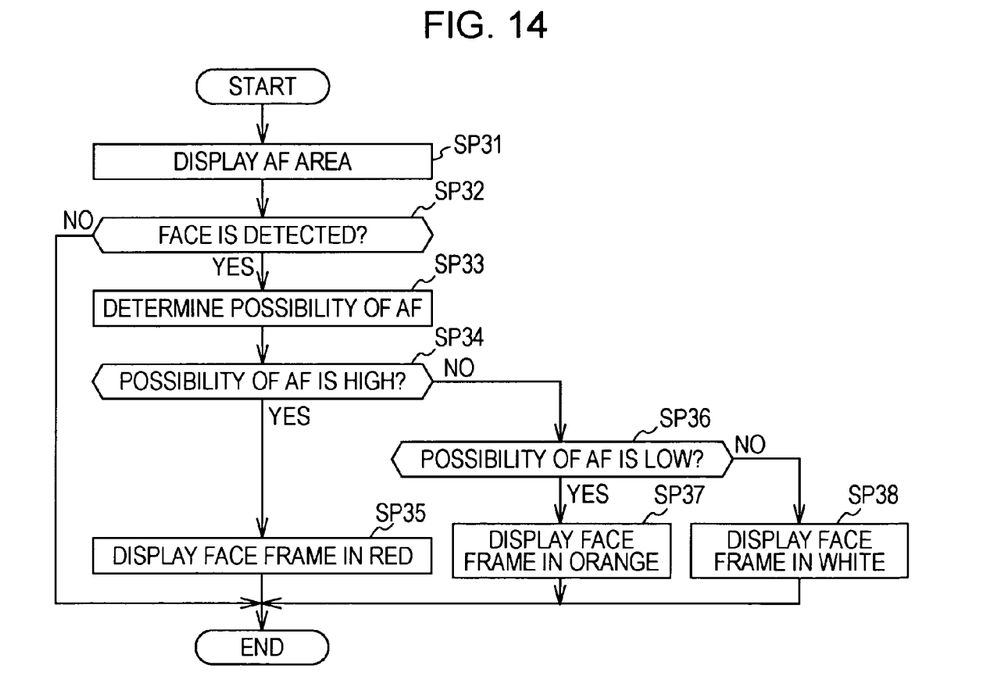
FIG. 14 is a flowchart of a display control operation performed before the AF operation according to the second embodiment.

The display control operation performed before the AF operation in the image pickup apparatus 1B will be described. FIG. 14 is a flowchart of the display control operation performed before the AF operation.

Referring to FIG. 14, the process proceeds to step SP31 when the EVF mode is selected in response to, for example, the operation of the display switch 9.

In step SP31, the live view image is displayed on the monitor 12 by the display controller 124, and all of the corresponding AF areas Ef are superimposed on the monitor 12.

In step SP32, the object detector 123 determines whether or not a specific object is detected. If a specific object is detected, the process proceeds to step SP33. If no specific object is detected, the display control operation before the AF operation is ended.

In step SP33, the phase-difference AF controller 121 determines the focusing possibility of the detected specific object.

If the focusing possibility of the specific object is high, the process proceeds to step SP35 through step SP34.

In step SP35, the display controller 124 displays the face frame WK for the specific object in red.

If the focusing possibility of the specific object is low, the process proceeds to step SP37 through steps SP34 and SP36.

In step SP37, the display controller 124 displays the face frame WK for the specific object in orange.

If the focusing possibility of the specific object is zero, the process proceeds to step SP38 through steps SP34 and SP36.

In step SP38, the display controller 124 displays the face frame WK for the specific object in white.

As described above, in the image pickup apparatus 1B, the display mode of the face frame WK which indicates the specific object is changed in accordance with the focusing possibility that the detected specific object can be brought into focus.

3. Modifications

Although the embodiments of the present invention have been described, the present invention is not limited to the above-described embodiments.

For example, in each of the above-described embodiments, a human face set as the specific object. However, the present invention is not limited to this, and other body parts (for example, the trunk) may also be set as the specific object.

In addition, instead of the human face, a face of an animal (for example, a dog or a cat) may also be set as the specific object.

In addition, according to the above-described embodiment, the display mode of each face frame WK is changed by changing the color in which the face frame WK is displayed. However, the display mode of each face frame WK may also be changed by changing the shape of the face frame WK.

In addition, according to the present embodiment, if the number of area pixels which are included in the specific object is less than the predetermined number but at least some of the area pixels are included in the specific object, it is determined that the "degree of overlap between the specific object and the corresponding AF areas Ef is low". However, the present invention is not limited to this.

More specifically, the above-described predetermined number may be set as a first predetermined number, and a second predetermined number which is lower than the first predetermined number may be additionally set. Then, the degree of overlap may be determined on the basis of the two predetermined numbers. If the number of area pixels which are included in the specific object is less than the first predetermined number and more than the second predetermined number, it can be determined that the "degree of overlap between the specific object and the corresponding AF areas Ef is low".

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus, comprising:
   an image pickup device which captures an image regarding an object image;
   object detecting means for detecting a specific object from the captured image;
   focus control means for executing a focusing operation on the basis of a phase-difference detection signal obtained from a distance measurement area set at a predetermined position in an image capturing area;
   display control means for causing a display unit to display a display element indicating a position of the specific object and one or more display elements regarding the distance measurement area;
   first determining means for determining whether or not the focusing operation has been executed on the basis of the phase-difference detection signal regarding the specific object; and
   second determining means for determining whether or not the specific object which has been detected overlaps any one of the one or more display elements regarding the distance measurement area, and when a determination result thereof indicates that an overlap exist for determining whether or not the focusing operation can be performed based on the phase-difference detection signal regarding the specific object, and when the determination result thereof indicates that the overlap does not exist for determining that the focusing operation cannot be performed,
   wherein the display control means changes a display mode of the display element indicating the position of the specific object in accordance with the result of the determination performed by the first determining means,
   wherein the display control means changes the display mode of the display element indicating the position of the specific object in accordance with the result of the determination performed by the second determining means before the execution of the focusing operation, and
   wherein each said display mode is represented by a respective predetermined color such that a first display mode is represented by a first predetermined color, a second display mode is represented by a second predetermined color, and a third display mode is represented by a third predetermined color, in which each of the first predetermined color, the second predetermined color and the third predetermined color is different from each other so that changes in the display mode are represented by predetermined color changes.

2. The image pickup apparatus according to claim 1, wherein the display control means changes the display mode of the display element indicating the position of the specific object if it is determined by the first determining means that the focusing operation has been executed on the basis of the phase-difference detection signal regarding the specific object.

3. The image pickup apparatus according to claim 2, wherein the display control means causes the display unit to remove the display element regarding the distance measurement area after the execution of the focusing operation.

4. The image pickup apparatus according to claim 3, wherein the display control means causes the display unit to display a preview image before a main image capturing operation on the basis of images successively captured by the image pickup device and causes the display unit to display the display element or elements regarding the distance measurement area and the display element indicating the position of the specific object on the preview image before the execution of the focusing operation.

5. The image pickup apparatus according to claim 4, wherein the specific object includes a human face.

6. The image pickup apparatus according to claim 3, further comprising:
   determining means for determining a possibility that the specific object can be brought into focus,
   wherein the display control means changes the display mode of the display element indicating the position of the specific object in accordance with the possibility before the execution of the focusing operation.

7. A method for controlling an image pickup apparatus, comprising the steps of:
   detecting a specific object from an image captured by an image pickup device;
   causing a display unit to display a display element indicating a position of the specific object and one or more display elements regarding a distance measurement area set at a predetermined position in an image capturing area;
   executing a focusing operation on the basis of a phase-difference detection signal obtained from the distance measurement area;
   first determining whether or not the specific object which has been detected overlaps any one of the one or more display elements regarding the distance measurement area, and when a determination result thereof indicates that an overlap exist for determining whether or not the focusing operation can be performed based on the phase-difference detection signal regarding the specific object, and when the determination result thereof indicates that the overlap does not exist for determining that the focusing operation cannot be performed;

second determining whether or not the focusing operation has been executed on the basis of the phase-difference detection signal regarding the specific object; and changing a display mode of the display element indicating the position of the specific object in accordance with the result of the first determining and a result of the second determining, wherein each said display mode is represented by a respective predetermined color such that a first display mode is represented by a first predetermined color, a second display mode is represented by a second predetermined color, and a third display mode is represented by a third predetermined color, in which each of the first predetermined color, the second predetermined color and the third predetermined color is different from each other so that changes in the display mode are represented by predetermined color changes.

8. An image pickup apparatus, comprising:

an image pickup device which captures an image regarding an object image;

an object detector detecting a specific object from the captured image;

a focus control unit configured to execute a focusing operation on the basis of a phase-difference detection signal obtained from a distance measurement area set at a predetermined position in an image capturing area;

a display control unit configured to cause a display unit to display a display element indicating a position of the specific object and one or more display elements regarding the distance measurement area; and a first determining unit configured to determine whether or not the focusing operation has been executed on the basis of the phase-difference detection signal regarding the specific object; and a second determining unit configured to determine whether or not the specific object which has been detected overlaps any one of the one or more display elements regarding the distance measurement area, and when a determination result thereof indicates that an overlap exist to determine whether or not the focusing operation can be performed based on the phase-difference detection signal regarding the specific object, and when the determination result thereof indicates that the overlap does not exist to determine that the focusing operation cannot be performed, wherein the display control unit changes a display mode of the display element indicating the position of the specific object in accordance with the result of the determination performed by the first determining unit, wherein the display control unit changes the display mode of the display element indicating the position of the specific object in accordance with the result of the determination performed by the second determining unit before the execution of the focusing operation, and wherein each said display mode is represented by a respective predetermined color such that a first display mode is represented by a first predetermined color, a second display mode is represented by a second predetermined color, and a third display mode is represented by a third predetermined color, in which each of the first predetermined color, the second predetermined color and the third predetermined color is different from each other so that changes in the display mode are represented by predetermined color changes.

* * * * *